(12) United States Patent
Hardek

(10) Patent No.: US 10,085,101 B2
(45) Date of Patent: Sep. 25, 2018

(54) SYSTEMS AND METHODS FOR DETERMINING MICROPHONE POSITION

(71) Applicant: Hand Held Products, Inc., Fort Mill, SC (US)

(72) Inventor: David D. Hardek, Allison Park, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/209,145

(22) Filed: Jul. 13, 2016

(65) Prior Publication Data

US 2018/0020305 A1    Jan. 18, 2018

(51) Int. Cl.
| | |
|---|---|
| *H04R 29/00* | (2006.01) |
| *G10L 15/01* | (2013.01) |
| *G10L 15/06* | (2013.01) |
| *G10L 15/26* | (2006.01) |
| *G10L 15/16* | (2006.01) |
| *G10L 15/02* | (2006.01) |

(52) U.S. Cl.
CPC ............ *H04R 29/004* (2013.01); *G10L 15/01* (2013.01); *G10L 15/16* (2013.01); *G10L 15/26* (2013.01); *G10L 2015/025* (2013.01); *G10L 2015/0631* (2013.01)

(58) Field of Classification Search
CPC ....... H04R 29/004; G10L 15/01; G10L 15/16; G10L 15/26; G10L 2015/025; G10L 2015/063
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,496,387 | B2 | 2/2009 | Byford et al. |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 13/367,978, filed Feb. 7, 2012, (Feng et al.); now abandoned.

(Continued)

*Primary Examiner* — Andrew L Sniezek
(74) *Attorney, Agent, or Firm* — Additon, Higgins & Pendleton, P.A.

(57) ABSTRACT

A method for determining a relative position of a microphone may include capturing speech audio from a user's mouth with the microphone so that the microphone outputs an electrical signal indicative of the speech audio; determining an indication of a position of the microphone relative to the user's mouth, which may include providing a plurality of inputs to a computerized discriminative classifier, wherein an input of the plurality of inputs is derived from the electrical signal, and wherein an output from the computerized discriminative classifier is indicative of the position of the microphone relative to the user's mouth.

21 Claims, 6 Drawing Sheets

(56) References Cited

U.S. PATENT DOCUMENTS

| | | |
|---|---|---|
| 7,726,575 B2 | 6/2010 | Wang et al. |
| 7,885,419 B2 | 2/2011 | Wahl et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein, Jr. et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |

(56) References Cited

U.S. PATENT DOCUMENTS

| | | |
|---|---|---|
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,236,050 B2 | 1/2016 | DiGregorio |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2003/0067585 A1 | 4/2003 | Miller et al. |
| 2003/0068057 A1 | 4/2003 | Miller et al. |
| 2006/0069557 A1 | 3/2006 | Barker et al. |
| 2007/0038442 A1 | 2/2007 | Visser et al. |
| 2007/0063048 A1 | 3/2007 | Havens et al. |
| 2008/0304360 A1 | 12/2008 | Mozer |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0141925 A1 | 6/2011 | Velenko et al. |
| 2011/0169999 A1 | 7/2011 | Grunow et al. |
| 2011/0202554 A1 | 8/2011 | Powilleit et al. |
| 2011/0255725 A1 | 10/2011 | Faltys et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |

(56) References Cited

U.S. PATENT DOCUMENTS

| | | |
|---|---|---|
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1* | 9/2014 | DiGregorio ............. G10L 15/20 704/231 |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0189716 A1* | 6/2016 | Lindahl ................... G10L 15/32 704/233 |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

OTHER PUBLICATIONS

U.S. Appl. No. 14/277,337 for Multipurpose Optical Reader, filed May 14, 2014 (Jovanovski et al.); 59 pages; now abandoned.

(56) References Cited

OTHER PUBLICATIONS

U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.

\* cited by examiner

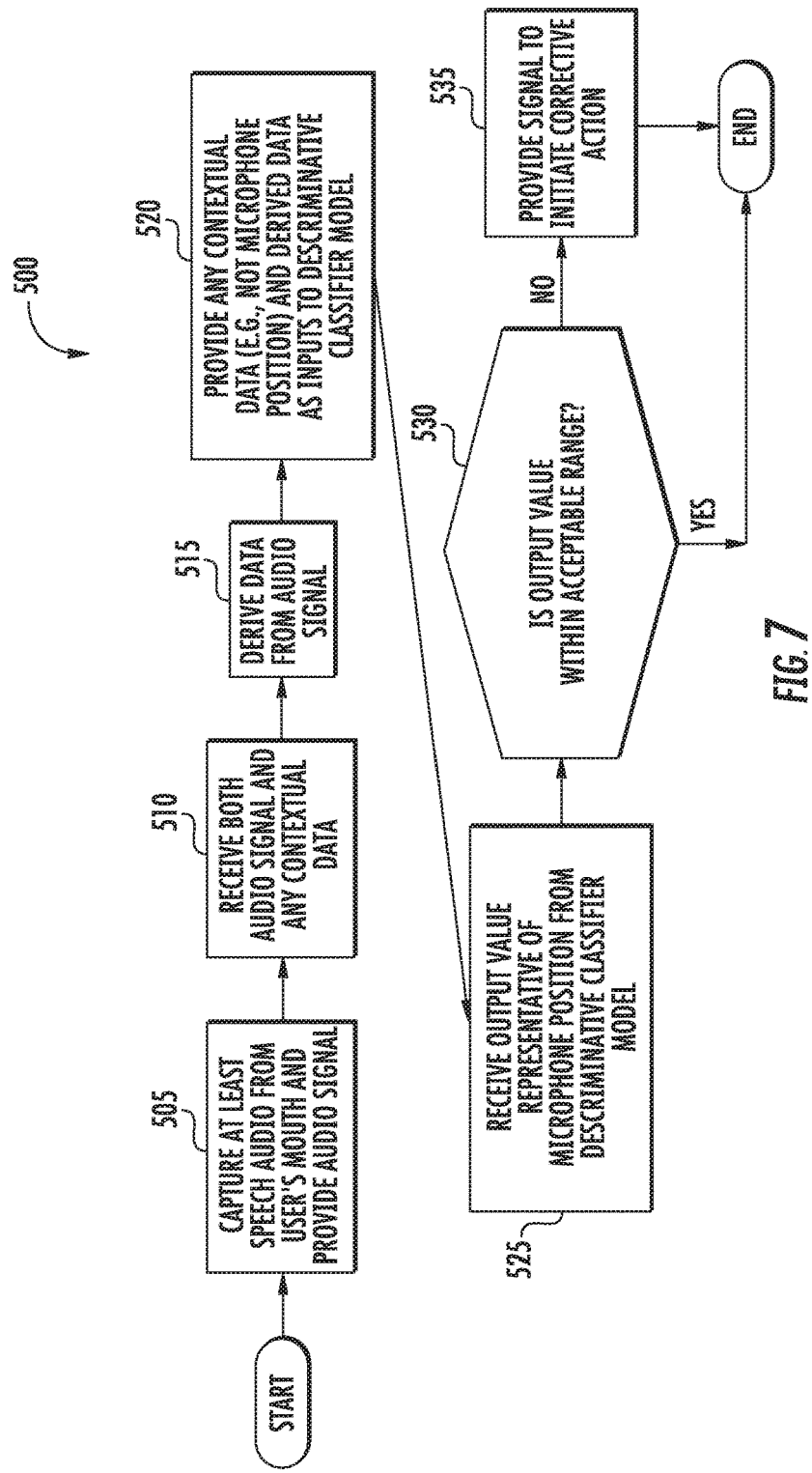

SYSTEMS AND METHODS FOR DETERMINING MICROPHONE POSITION

FIELD OF THE INVENTION

The present invention generally relates to a microphone for receiving a verbal utterances from a user's mouth and, more particularly, to automated systems and methods for determining the proximity of the microphone to the user's mouth.

BACKGROUND

An example of an advantage provided by speech recognition equipment is that a person can use speech recognition equipment to verbally communicate with a computer in a hands-free manner. For example, a person may verbally communicate with the computer by way of a microphone that is part of a headset, or the like. A factor in the accuracy of such communicating can be the position of the microphone relative to the user's mouth. For example, best results may be achieved when the microphone is positioned in an optimal position relative to the user's mouth. However, there can be a wide variety of reasons why a user does not position the microphone in the optimal position, such as the user's inexperience or forgetfulness, the optimal position varying in response to different environmental noises or different equipment setups, or the like.

Therefore, there is a need for a system and method for automatically determining the approximate position of a microphone relative to a user's mouth, for example in real time, so that the determined position may be considered in determining whether corrective positional adjustments to the microphone may increase the functionality of the speech recognition equipment, and the determined position may be considered in performance metrics (e.g., analysis of speech recognition performance).

SUMMARY

In one aspect, the present invention embraces a method for determining a relative position of a microphone, the method comprising: capturing speech audio from a user's mouth with the microphone so that the microphone outputs an electrical signal indicative of the speech audio; determining an indication of a position of the microphone relative to the user's mouth, comprising providing a plurality of inputs to a computerized discriminative classifier, wherein an input of the plurality of inputs is derived from the electrical signal, and wherein an output from the computerized discriminative classifier is indicative of the position of the microphone relative to the user's mouth.

In an embodiment, the method comprises a computer determining whether the determined indication of the position of the microphone is unacceptable; and the computer providing a signal in response to the computer determining that the determined indication of the position of the microphone is unacceptable.

In an embodiment, the method comprises a computer deriving the input from the electrical signal.

In an embodiment, the method comprises calculating a Fourier transformation on data selected from the group consisting of the electrical signal and data derived from the electrical signal.

In an embodiment, the input comprises results from the calculating of the Fourier transformation.

In an embodiment, the input is derived from results from the calculating of the Fourier transformation.

In an embodiment, the method comprises decoding a phoneme from data selected from the group consisting of the electrical signal and data derived from the electrical signal.

In an embodiment, the input comprises the phoneme, and the decoding of the phoneme is comprised of using a text-to-phoneme engine.

In an embodiment, the method comprises deriving first and second inputs of the plurality of inputs from the electrical signal; and weighting the first input more heavily than any weighting of the second input in the computerized discriminative classifier.

In an embodiment, the method comprises providing first and second phenomes that are different from one another, comprising performing text-to-phenome conversions, wherein the first input comprises the first phenome, and wherein the second input comprises the second phenome.

In another aspect, the present invention embraces a method for determining a relative position of a microphone, the method comprising: providing a plurality of inputs to a discriminative classifier implemented on a computer, the plurality of inputs comprising data selected from the group consisting of an electrical signal output from the microphone in response to the microphone capturing speech audio from a user's mouth while the microphone is at a position relative to the user's mouth, and data derived from the electrical signal; the computer receiving an output from the discriminative classifier, the output providing an indication of the position of the microphone relative to the user's mouth; and the computer determining whether the indicated position of the microphone is unacceptable, and providing a signal if the indicated position of the microphone is unacceptable.

In an embodiment, the microphone is part of a head set that comprises a speaker, and the method comprises the speaker providing an audio indication that the position of the microphone is unacceptable, wherein the speaker providing the audio indication is in response to the computer providing the signal.

In an embodiment, the method comprises deriving the input from the electrical signal, wherein the input is selected from the group consisting of a Fourier transform and a phenome.

In another aspect, the present invention embraces a method for determining a relative position of a microphone, the method comprising: capturing speech audio from a user's mouth with the microphone so that the microphone outputs an electrical signal indicative of the speech audio; a computer deriving a plurality of inputs from the electrical signal; determining an indication of a position of the microphone relative to the user's mouth, comprising providing at least the plurality of inputs to a discriminative classifier implemented on the computer; the computer receiving an output from the discriminative classifier, the output providing an indication of the position of the microphone relative to the user's mouth; and the computer determining whether the indicated position of the microphone is unacceptable, and providing a signal if the indicated position of the microphone is unacceptable.

In an embodiment, the method comprises the computer calculating a Fourier transformation on data selected from the group consisting of the electrical signal and data derived from the electrical signal, wherein an input of the plurality of inputs comprises results from the calculating of the Fourier transformation.

In an embodiment, the method comprises the computer calculating a Fourier transformation on data selected from the group consisting of the electrical signal and data derived from the electrical signal, wherein an input of the plurality of inputs is derived from results from the calculating of the Fourier transformation.

In an embodiment, the method comprises the computer decoding a phoneme from data selected from the group consisting of the electrical signal and data derived from the electrical signal, wherein an input of the plurality of inputs comprises the phoneme.

In an embodiment, the method comprises the computer decoding the phoneme using a text-to-phoneme engine.

In an embodiment, the method comprises deriving first and second inputs of the plurality of inputs from the electrical signal; and weighting the first input more heavily than any weighting of the second input in the discriminative classifier.

In an embodiment, the method comprises providing first and second phenomes that are different from one another, comprising performing text-to-phenome conversions, wherein the first input comprises the first phenome, and the second input comprises the second phenome.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 6 illustrates a flow diagram of an example of a method of using the test data associated with FIG. 3 to test the effectiveness of the discriminative classifier model for accuracy, wherein FIG. 5 is generally illustrative of the inputs and outputs of the discriminative classifier model associated with the testing method of FIG. 6.

FIG. 7 illustrates a flow diagram of an example of a method of using the discriminative classifier model to indirectly determine the approximate position of the microphone relative to a user's mouth, and initiating any associated corrective repositioning of the microphone, wherein FIG. 5 is generally illustrative of the inputs and outputs of the discriminative classifier model associated with the position-checking method of FIG. 7.

DETAILED DESCRIPTION

The present invention is generally directed to systems and methods for automatically determining a position of a microphone relative to a user's mouth, so that the determined position may be considered in determining whether corrective positional adjustments to the microphone may increase the functionality of an associated speech recognition module. In addition or alternatively, the determined position may be considered in performance metrics (e.g., analysis of speech recognition performance). In an embodiment of this disclosure, such a system for automatically determining the approximate position of the microphone can be part of a larger system that can include a mobile device, and the mobile device can be a headset assembly that includes the microphone. The mobile device, or headset assembly, can be associated with a voice recognition module configured for allowing the mobile device to be used in a hands-free manner. Alternatively, the mobile device can be manually carried or mounted to a movable piece of equipment, such as a cart being used by a worker.

Figure 1:
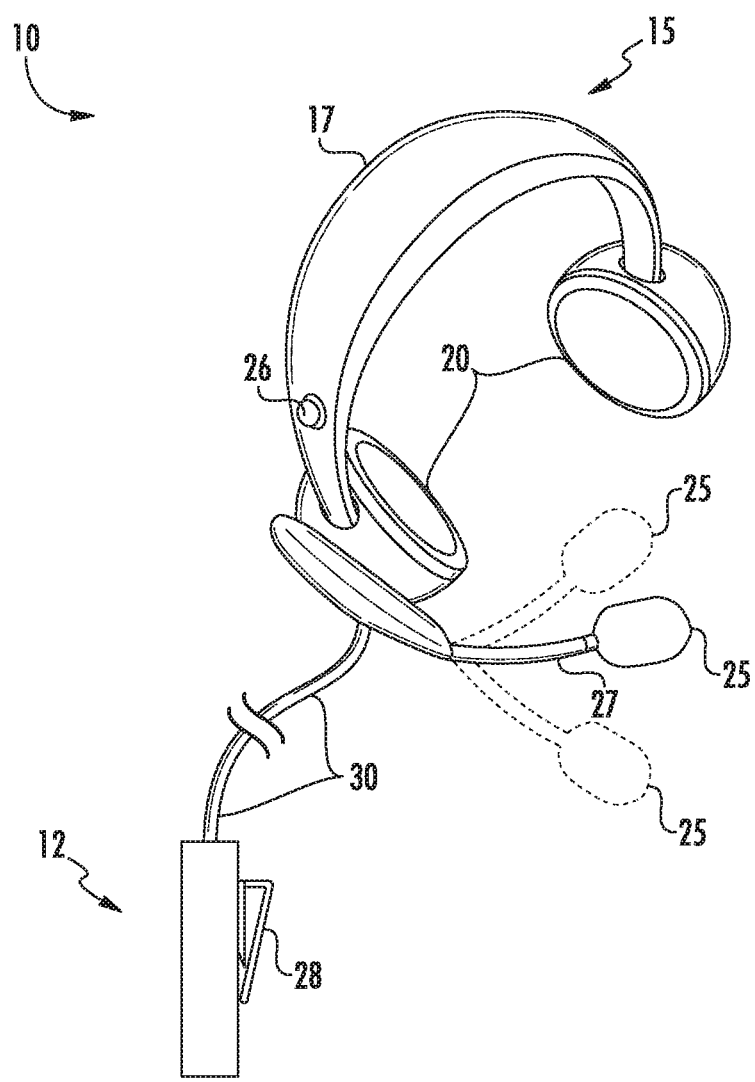
FIG. 1 is a schematic perspective view of a representative headset assembly, wherein several different microphone positions are shown, in accordance with an embodiment of this disclosure.

In FIG. 1, an example of a mobile device in the form of a headset assembly 10 is shown as including an electronics module 12 and a headset 15, in accordance with an embodiment of this disclosure. Whereas the mobile device described in this detailed description is frequently referred to as the headset assembly 10, a variety of different types of suitable mobile devices are within the scope of this disclosure, such as smartphones, smartwatches or other suitable devices.

In the embodiment shown in FIG. 1, the headset 15 includes a frame, and the frame comprises a headband 17 for securing the headset to the user's head. Alternatively, the frame, headband 17 or other suitable fastening or mounting features can be configured to fit in an ear, over an ear, or otherwise be designed to support the headset 15, or the like. The headset 15 can further include at least one speaker 20 connected to the headset frame or headband 17, and one or more microphones 25, 26 connected to the headset frame or headband. For example, in one configuration, the main microphone 25 can be configured to be proximate the user's mouth, for converting voice sounds from the user into an electrical signal. In contrast, the optional secondary microphone 26 can be configured to be distant from the user's mouth, for use in receiving background or environmental sounds, such as for use in cancelling out environmental sounds to enhance voice recognition associated with the main microphone 25.

The position of the main microphone 25 relative to the user's mouth may be adjustable, such as by adjusting the position of the headset frame or headband 17 relative to the user's head. For example, in one embodiment, the main microphone 25 can be fixed in position relative to the headset frame or headband 17, so that during positional adjustments of the headset frame or headband the main microphone moves with the headset frame or headband relative to the user's head and, thus, relative to the user's mouth. In contrast or addition, as schematically shown with dashed lines in FIG. 1, the main microphone 25 can be movably mounted to the headset frame or headband 17, so that the position of the main microphone can be simultaneously adjusted relative to both the headband 17 and the user's mouth. For example and shown in FIG. 1, the main microphone 25 can be fixedly mounted to an outer end of a "boom arm" or extension rod 27, and the inner end of the extension rod can be pivotably connected to the headset frame, headband 17, or another suitable feature of the headset 15; and/or the extension rod may be flexible, so that the position of the main microphone can be adjusted between numerous positions relative to the user's mouth. Examples of some of the adjustable positions of the outer end of the extension rod 27 and main microphone 25 are schematically illustrated in dashed lines in FIG. 1, wherein the position of the main microphone shown in solid lines may be an optimal position for voice recognition, and the positions of the main microphone shown in dashed lines may be less optimal positions that are too close or too far from the user's mouth.

The electronics module 12 of the headset assembly 10 can contain or otherwise carry several components of the headset assembly to reduce the weight and/or size of the headset 15. In some embodiments, the electronics module 12 can include one or more of a rechargeable or long life battery, keypad, antenna (e.g., Bluetooth® antenna), printed circuit board assembly, and any other suitable electronics, or the like, as discussed in greater detail below. The electronics module 12 can be releasably mounted to a user's torso or in any other suitable location for being carried by the user, typically in a hands-free manner. The electronics module 12 can utilize a user-configurable fastener or attachment feature 28, such as a belt clip, lapel clip, loop, lanyard and/or other suitable features, for at least partially facilitating attachment of the electronics module to the user. The headset 15 can be connected to the electronics module 12 via a communication link, such as a small audio cable 30 or a wireless link.

For example and not for the purpose of limiting the scope of this disclosure, the headset 10 can be used to support multiple workflows in multiple markets, including grocery retail, direct store delivery, wholesale, etc. In some embodiments, the headset 10 has a low profile that seeks not to be intimidating to a customer in a retail setting. That is, the headset 15 can be relatively minimalistic in appearance in some embodiments, or alternatively the headset 15 can have a larger profile in other embodiments. The electronics module 12 can be used with a wide variety of differently configured headsets, such as Vocollect™ headsets.

The electronics module 12 can be configured to read a unique identifier (I.D.) of the headset 15. The headset I.D. can be stored in an electronic circuitry package that is part of the headset 15, and the headset electronic circuitry package can be configured to at least partially provide the connection (e.g., communication path(s)) between the electronics module 12 and headset features (e.g., the one or more speakers 20 and microphones 25, 26). In one embodiment, the audio cable 30 includes multiple conductors or communication lines, such as for providing audio signals from the electronics module 12 to the headset 15 (i.e. the speakers 20), and providing audio signals from the headset (i.e., the microphones 25, 26) to the electronics module. When a wireless communications link between the headset 15 and electronics module 12 is used, such as a wireless local area network (e.g., a Bluetooth® type of communication link), the headset 15 can include a small lightweight battery and other suitable features. The wireless communication link can provide wireless signals suitable for exchanging voice communications. In an embodiment (not shown), the electronics module 12 can be integrated into the headset 15 rather than being remote from, and connected to, the headset 15. Accordingly, the mobile device, which may more specifically be in the form of the headset assembly 10, or the like, may include multiple pieces with separate housings or can be substantially contained in, or otherwise be associated with, a single housing.

Figure 2:
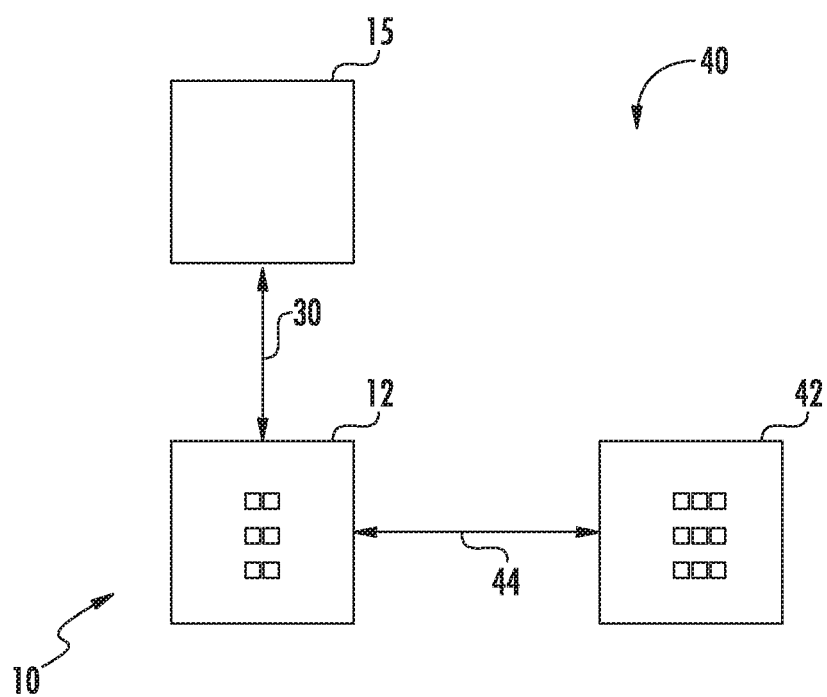
FIG. 2 illustrates a block diagram of a system that includes the headset assembly of FIG. 1, in accordance with an embodiment.

In the embodiment schematically shown in FIG. 2, the headset assembly 10 is part of a distributed system 40 that further includes a terminal, server computer 42, or the like, connected to the electronics module 12 via a wireless line or communication path 44, such as a Bluetooth® connection.

The system 40 is configured for providing communications with at least one user. For example, the user can be wearing the headset 15 on her or his head so that the speakers 20 are proximate the user's ears, the main microphone 25 is proximate the user's mouth, and communications can be traveling in both directions across the communication path 44, as discussed in greater detail below.

As indicated above and discussed in greater detail below, the electronics module 12 can contain or otherwise carry several components (e.g., software, firmware and/or hardware) of the headset assembly 10. In this regard, the housing or frame of the electronics module 12 is schematically represented by an outer block in FIG. 2, and components of the electronics module are schematically represented by a series of blocks that are shown within the outer block that represents the housing or frame electronics module. For example, the above-mentioned printed circuit board assembly of the electronics module 12 can include processing circuitry in the form of one or more suitable processors or central processing units. In addition, the electronics module 12 can include an audio input/output circuit or stage that is appropriately coupled to the headset 15 for coupling the electronics module processing circuitry with the microphones 25, 26 and speaker 20. The processor of the electronics module 12 can be operatively associated with one or more memory elements that can contain one or more software modules for being executed by the processor of the electronics module. The processing circuitry of the electronics module 12 typically includes a suitable radio, such as a wireless local area network radio (e.g., Bluetooth®), for coupling to the computer 40 as indicated by the communication path 44, although other suitable communication networks may be used.

The computer 42 can be one or more computers, such as a series of computers connected to one another in a wired and/or wireless manner over a network, such as a wireless local area network, to form a distributed computer system. More generally, throughout this document any reference to an article (e.g., computer 42) encompasses one or more of that article, unless indicated otherwise. As a specific example, and not for the purpose of limiting the scope of this disclosure, the computer 42 can comprise a retail store computer having applications and data for managing operations of the retail store (e.g., an enterprise system, such as a retail management system, inventory management system or the like), including inventory control and other functions, such as point of sale functions.

In an embodiment, the computer 42 is configured to simultaneously interface with multiple of the headset assemblies 10, and thereby the users respectively associated with the headset assemblies, to simultaneously provide one or more work tasks or workflows that can be related to products or other items being handled by the users (e.g., workers) in a workplace (e.g., a retail store, warehouse, restaurant, or the like). The computer 42 can be located at one facility or be distributed at geographically distinct facilities. Furthermore, the computer 42 may include a proxy server. Therefore, the computer 42 is not limited in scope to a specific configuration. For example, and alternatively, each of the headset assemblies 10 can substantially be a stand-alone device, such that the computers 42 or suitable features thereof are part of the headset assemblies. Usually, however, to have sufficient database capability to simultaneously handle large amounts of information that can be associated with multiple headset assemblies 10 being operated simultaneously, the computer 42 typically comprises a server computer configured to simultaneously interface with multiple of the headset assemblies (e.g., mobile devices).

As alluded to above, the computer 42 can contain or otherwise carry several components (e.g., software, firmware and/or hardware). In this regard and as shown in FIG. 2, components of the computer 42 are schematically represented by a series of blocks that are within an outer block that schematically represents the computer 42 as a whole. The computer 42 typically includes a suitable radio, such as a wireless local area network radio (e.g., Bluetooth®), for coupling to the electronics module 12, as indicated by the communication path 44, although other suitable communication networks may be used. Additionally, the computer 42 can include one or more processing units, memory (e.g., volatile memory and non-volatile memory), and removable and non-removable storage (e.g., random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions). Although the various data storage elements may be an integral part of the computer 42, the storage can also or alternatively include cloud-based storage accessible via a network, such as the Internet. The computer 42 can include or have access to a computing environment that includes one or more outputs and inputs. The output can include a display device, such as a touchscreen, that also can serve as an input device. The input can include one or more of a touchscreen, touchpad, mouse, keyboard, camera, one or more device-specific buttons, one or more sensors integrated within or coupled via wired or wireless data connections to the computer, and other input devices. For example, the computer 42 can comprise a personal computer, desktop, laptop, server, smartphone, tablet, headset, smartwatch, and/or other suitable device(s).

As alluded to above, the system 40 can be used in various speech-directed/speech-assisted work environments. Accordingly, the processor of the computer 42 can execute or run one or more speech recognition (e.g., speech-to-text) software modules and/or text-to-speech software modules, although one or more of these software modules may be executed on the electronics module 12 instead. More specifically, the computer 42 can include a speech recognition module, or more specifically a speech-to-text decoder, configured to transform electronic audio signals, which are generated by the main microphone 25 capturing speech audio from the user's mouth, into text data, or the like. For example, speech-to-text decoder can include voice templates that are stored in the computer 42 and configured to recognize user voice interactions and convert the interaction into text-based data. That text-based data can be utilized as information or instructions for interacting with at least one software application or module being executed on the computer 42. Both the above-discussed and the below-discussed functions ascribed to individual components of the system 40 can be performed in one or more other locations in further embodiments. For example, the computer 42 can perform voice recognition in one embodiment, or the electronics module 12 can perform voice recognition utilizing the voice templates. In one embodiment, the first stages of voice recognition can be performed on the electronics module 12, with further stages performed on the computer 42. In further embodiments, raw audio can be transmitted from the electronics module 12 to the computer 42 where the voice recognition is completed.

Functionality of (e.g., accuracy of the transforming performed by) the speech-to-text decoder of the system 40 may depend upon the position of the main microphone 25 relative to the user's mouth, wherein examples of a variety of different positions of the main microphone are shown in FIG. 1. In this regard, an aspect of this disclosure is the provision of systems and methods for automatically determining the approximate position of the main microphone 25 relative to a user's mouth, so that, in one example, the determined position may be considered in determining whether corrective positional adjustments to the main microphone may increase the functionality of speech-to-text decoder. In this regard, the computer 42 can further include a discriminative classifier model (e.g., the computerized discriminative classifier feature 305 of FIG. 5) configured to determine an indication of a position of the main microphone 25 relative to the user's mouth. The discriminative classifier model can be any suitable discriminative classifier model, such as, but not limited to, a neural network model. Reiterating from above, throughout this document any reference to an article encompasses one or more of that article, unless indicated otherwise. For example, embodiments of this disclosure can include one or more discriminative classifier models, neural network models and/or the like.

An overall method of an embodiment of this disclosure can include a data collecting method 100 (FIG. 3), a training method 200 (FIG. 4), a testing method 400 (FIG. 6), and a position-checking method 500 (FIG. 7). As an example and for ease of description, and not for the purpose of narrowing the scope of this disclosure, in the following the data collecting method 100 (FIG. 3), training method 200 (FIG. 4) and testing method 400 (FIG. 6) are discussed in the context of the system 40 including the above-discussed computer 42. However, one or more computers other than or in addition to the computer 42 can be used in at least the methods 100, 200 and 400. A very brief discussion of the methods 100, 200, 400, 500 is followed by more detailed discussions.

Generally described, the data collecting method 100 can be used to collect both a set of training data used in the training method 200, and a set of test data used in the testing method 400. The training method 200 can be used to create the discriminative classifier model using a discriminative classifier trainer (e.g. the computerized discriminative classifier trainer 305 of FIG. 5). The testing method 400 can be used to test the effectiveness of the discriminative classifier model, such as prior to putting the discriminative classifier model to use in the field. The position-checking method 500 can use the discriminative classifier model to indirectly determine the approximate position of the microphone 25 (FIG. 1) relative to a user's mouth, and can initiate any associated corrective repositioning of the microphone.

Figure 3:
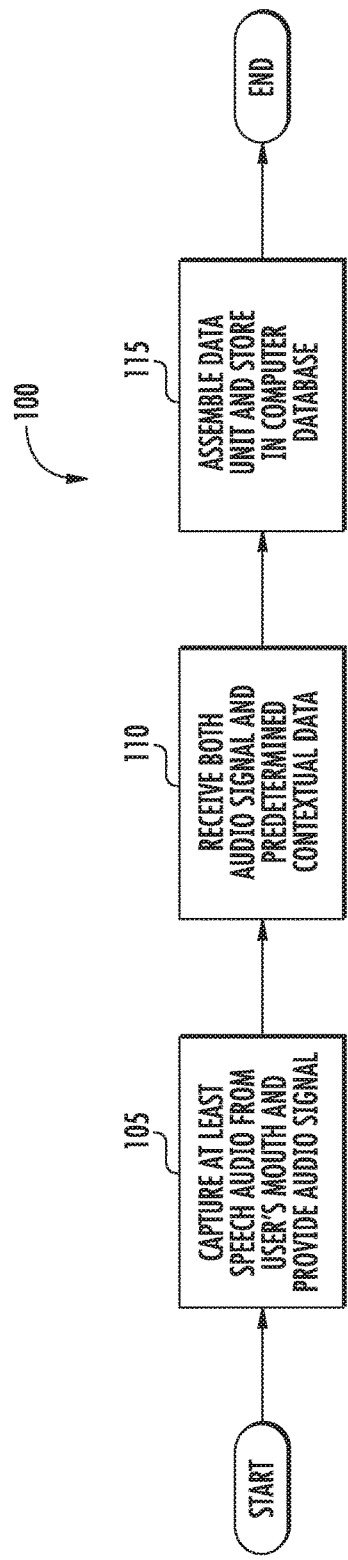
FIG. 3 illustrates a flow diagram of methods of collecting training data and test data for use with a discriminative classifier trainer and a discriminative classifier model, respectively, wherein both sets of data can include speech-based audio signals and microphone position data, in accordance with an embodiment.

Referring to FIG. 3, the data collecting method 100 can be performed so that the training data and the test data are collected in substantially the same manner, so that both of these data sets include at least speech-based audio signals and data about the position of the main microphone 25 relative to a user's mouth. In one embodiment, none of training data is used as part of the testing data, and none of the testing data is used as part of the training data.

At block 105 of the data collecting method 100, the main microphone 25 of a headset 15 being worn by a user captures speech audio from the user's mouth, and the headset assembly 10 responsively provides an electrical signal indicative of the speech audio to the computer 42, wherein the electrical signal can be an electronic audio signal. At substantially the same time that the headset assembly 10 responsively provides the audio signal of block 105 (e.g., in real time), at block 110 the computer 42 can receive the audio signal from block 105. Also at or associated with block 110, the computer 42 can obtain or receive data for one or more contextual variables that may be useful as inputs for the discriminative classifier trainer and/or the discriminative classifier model, depending upon whether training or test data is being collected. The data for the one or more contextual variables associated with block 110 can be referred to as contextual data. The contextual variables may include one or more of the measured position of the main microphone 25 relative to the user's mouth (e.g., the actual, manually measured distance between the main microphone and the user's mouth), any gain setting of the system 40 (e.g., for increasing the power or amplitude of the electronic audio signal originating at block 105), a classification of the background noise (e.g., identification of the frequency content of the background noise) and/or any other suitable information. It is typical for the contextual data that is in possession of the computer 42 at block 110 to have originated at the same time as the occurrence of block 105, or otherwise be representative of conditions occurring at block 105. For example, the measured position of the main microphone 25 relative to the user's mouth, or more specifically the distance between the main microphone and the user's mouth, may be manually measured with a ruler or any other suitable device while the microphone is positioned as it was at the occurrence of block 105, and the measured distance may be input to the computer 42 by way of a suitable input device of the computer.

Processing control is transferred from block 110 to block 115. At block 115, the data (typically including at least the audio signal and the measured position of the main microphone 25 relative to the user's mouth) received at block 110 is identified as being part of a data unit and stored in at least one database (e.g., a relational database) of, or otherwise associated with, the computer 42. In the data unit created at block 115, the audio signal of block 110 may be identified as the main data of the data unit, and the data unit can further include metadata, and the metadata may comprise the measured position of the main microphone 25 relative to the user's mouth, and any other suitable contextual data. As mentioned above, the computer 42 may be in the form of a distributed computer system. Similarly, one or more databases associated with the computer 42 can be in the form of a distributed database system.

In one embodiment, the data collecting method 100 is repeated numerous times for numerous different users. For each user, the speech audio and/or one or more of the contextual variables (e.g., the measured position of the microphone 25 (FIG. 1)) can be changed for each occurrence of the method 100 to provide numerous different data units, so that the audio signals and/or contextual data vary from data unit to data unit in a manner that seeks to optimize the training of the discriminative classifier model with the discriminative classifier trainer. For example, some of the users speaking into the microphone 25 at block 105 can be female, others can be male, and they will typically use a variety of different positions for the microphone 25 (e.g., as schematically shown in FIG. 1), and they can vary their speech levels (e.g., sometimes speak relatively softly, and sometimes speak relatively loudly).

As shown in FIG. 1, the different positions of the microphone 25 can include an inner position in which the microphone may be in contact with, or almost in contact with, the user's mouth; an intermediate position in which the microphone can be about one inch away from the user's mouth, which may be the preferred or optimal position; and an outer position in which the microphone can be about two inches away from the user's mouth. For each user, the data collecting method 100 can be repeated at least three times, for example with the microphone 25 being in the inner position during a first occurrence of the data collecting method and the creation of a first data unit, the microphone being in the intermediate position during a second occurrence of the data collecting method and the creation of a second data unit, and the microphone being in the outer position during a third occurrence of the data collecting method and the creation of a third data unit.

The data units resulting from performance of the method 100 can be generally segregated into two groups or respectively stored in two databases of, or associated with, the computer 42. For example, a first group of the data units can be referred to as training data units that are used in the training method 200 of FIG. 4, and a second group of the data units can be referred to as testing data units that are used in the testing method 400 of FIG. 6, as discussed in greater detail below. In one embodiment, each data unit is contained in either the first group or the second group, so that none of the data units are included in both of the first and second groups. For example, the training data units can be contained in, or otherwise associated with, a training database; whereas the testing data units can be contained in, or otherwise associated with, a testing database. In addition, the training data units and training database can include transcriptions of what was spoken by the users when providing the training data.

Figure 4:
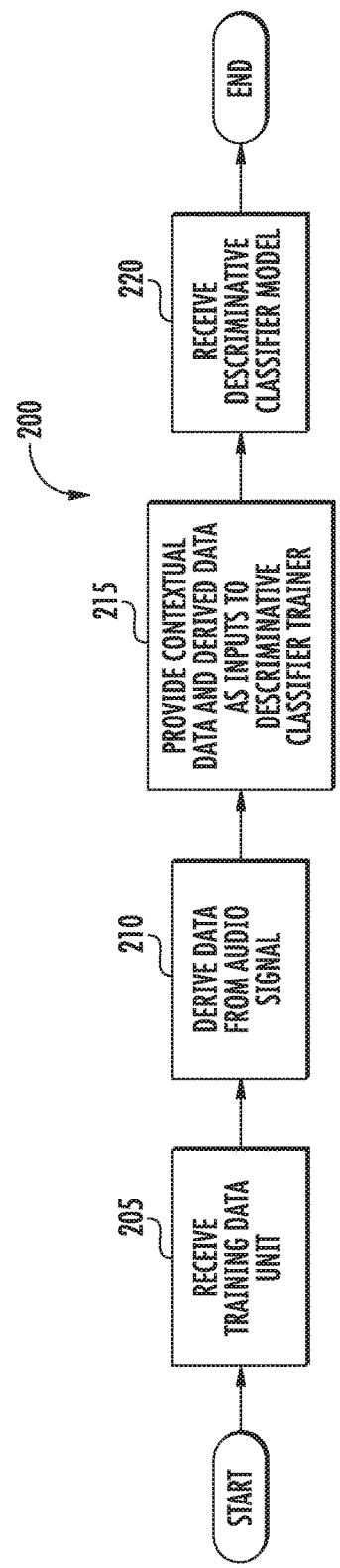
FIG. 4 illustrates a flow diagram of an example of a method of using the training data associated with FIG. 3 and the discriminative classifier trainer to create the discriminative classifier model, so that the discriminative classifier model is configured to provide an indication of a position of a microphone relative to a user's mouth.

In an embodiment described in the following, the training method 200 of FIG. 4 is performed by the computer 42 to create the discriminative classifier model. Referring to FIG. 4 in greater detail, at block 205, processing circuitry of the computer 42 obtains a training data unit, which was produced in accordance with the data collection method 100 of FIG. 3, from the respective database, or the like. Processing control is transferred from block 205 to block 210. At block 210, data is derived from the audio signal of the training data unit received at block 205, as discussed in greater detail below with reference to FIG. 5. Processing control is transferred from block 210 to block 215. At block 215, contextual data from the training data unit of block 205 and derived data from block 210 are provided as inputs to the discriminative classifier trainer, as discussed in greater detail below with reference to FIG. 5. Blocks 205, 210 and 215 may be looped through numerous times respectively for each training data unit so that the discriminative classifier trainer creates the discriminative classifier model, as discussed in greater detail below with reference to FIG. 5. From the last occurrence of block 215, processing control can be transferred to block 220, at which time the computer 42 receives the discriminative classifier model.

Figure 5:
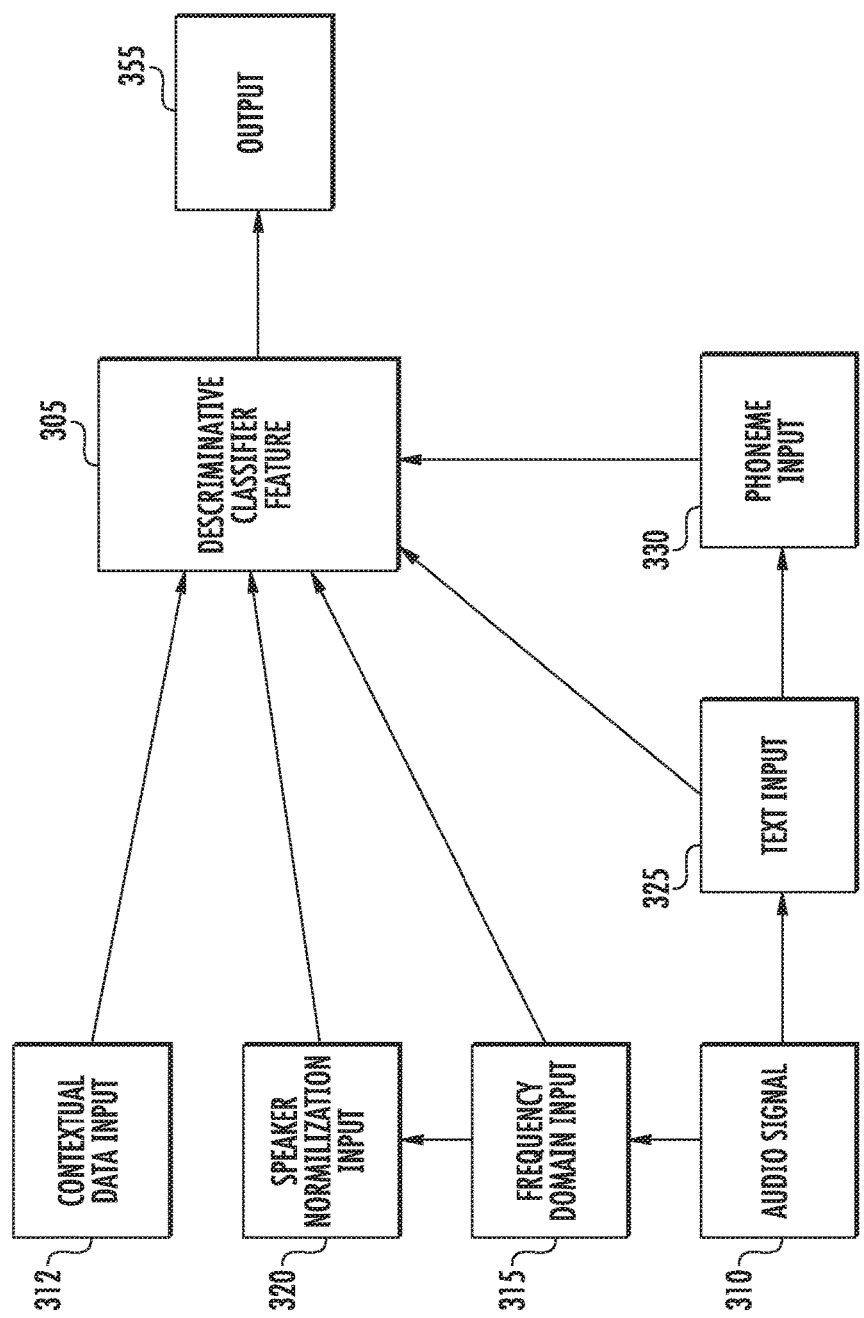
FIG. 5 generally illustrates a block diagram of the inputs and outputs of the discriminative classifier trainer, in accordance with the training method of FIG. 4.

In one embodiment, the portions of the training method 200 represented by blocks 210, 215 and 220 can be further understood with reference to FIG. 5, and the discriminative classifier feature represented by block 305 in FIG. 5 is the discriminative classifier trainer. Similarly and as will be discussed in greater detail below, respective blocks of the testing method 400 (FIG. 6) and position-checking method 500 (FIG. 7) can be further understood with reference to FIG. 5, and for the methods 400 and 500 the discriminative classifier feature represented by block 305 in FIG. 5 is the discriminative classifier model. Accordingly, numerous aspects of the following discussions of FIG. 5 can be generally applicable to, or part of, each of the methods 200, 400 and 500, as discussed in greater detail below.

Referring to FIG. 5 in greater detail in the context of the training method 200: the electrical audio signal 310 and contextual data input 312 are from the training data unit of block 205 in FIG. 4; the inputs 315, 320, 325, 330 to the discriminative classifier trainer 305 are derived from the electrical audio signal 310 at block 215 in FIG. 4; and the output 335 of the discriminative classifier trainer 305 is the discriminative classifier model of block 220 of FIG. 4. The discriminative classifier trainer 305 may be any suitable discriminative classifier trainer, such as, but not limited to, a neural network model trainer. For example, it is believed that a suitable discriminative classifier trainer may be developed using the MATLAB® programming language and/or Neural Network Toolbox™ available from MathWorks, Inc.

Figure 6:
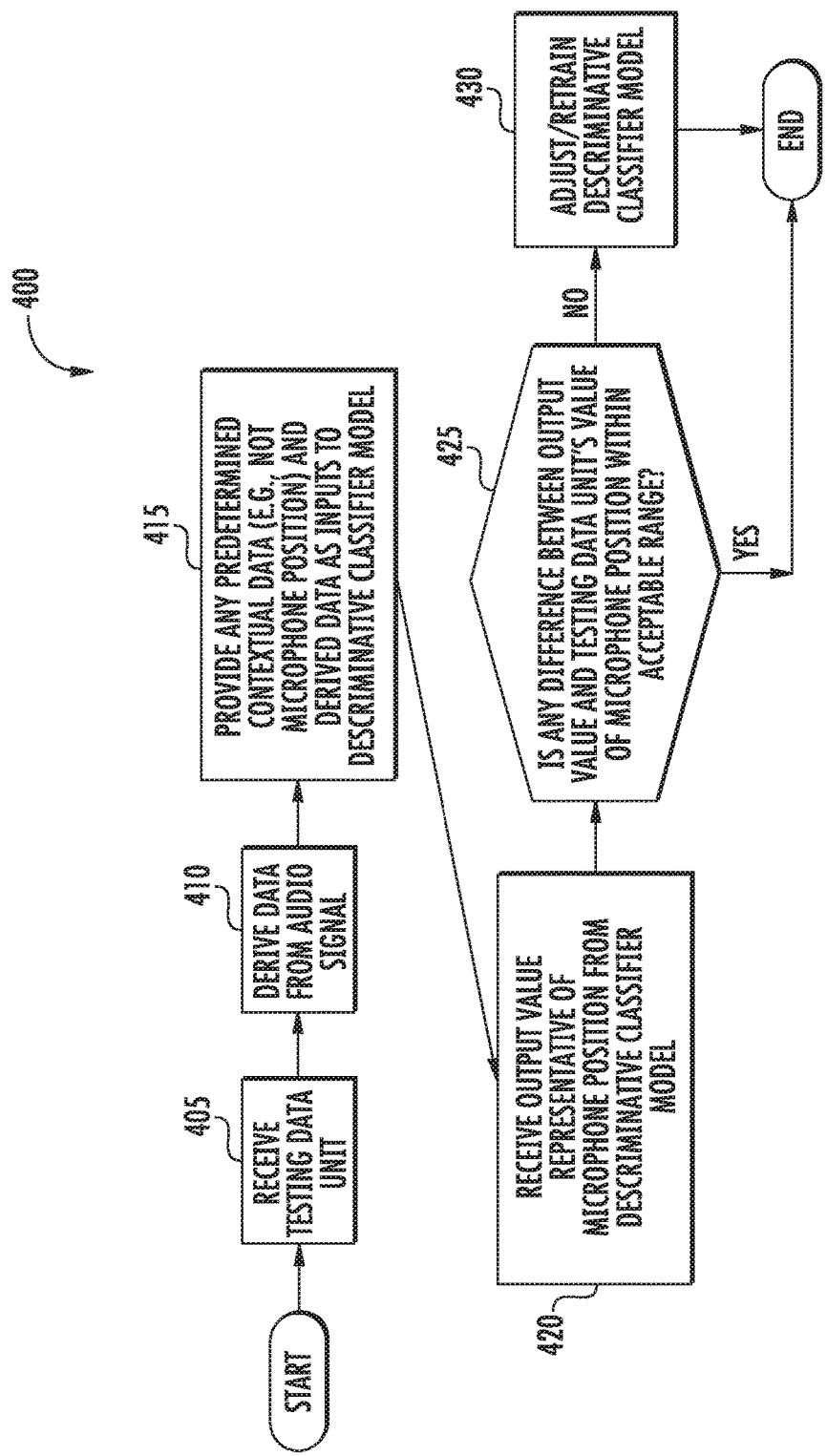

In an embodiment described in the following, the testing method 400 of FIG. 6 is performed by the computer 42 to test the effectiveness of the discriminative classifier model of block 220 of FIG. 4, such as prior to the discriminative classifier model being used in the position-checking method 500 of FIG. 7. Referring to FIG. 6 in greater detail, at block 405, processing circuitry of the computer 42 obtains a testing data unit, which was produced in accordance with the data collection method 100 of FIG. 3, from the respective database, or the like. Processing control is transferred from block 405 to block 410. At block 410, data is derived from the audio signal of the testing data unit received at block 405, as discussed in greater detail below with reference to FIG. 5. Processing control is transferred from block 410 to block 415. At block 415, any predetermined contextual data (e.g., not the measured position of the main microphone 25) from the testing data unit of block 405 and derived data from block 410 are provided as inputs to the discriminative classifier model, as discussed in greater detail below with reference to FIG. 5. Processing control is transferred from block 415 to block 420. At block 420, a discriminative classifier-derived value of the approximate position of the main microphone 25 relative to the user's mouth (e.g., the distance between the main microphone and the user's mouth) is received from the discriminative classifier model.

Further regarding the testing method 400 of FIG. 6 that can be used to test the effectiveness of the discriminative classifier model, processing control is transferred from block 420 to block 425. At block 425, the discriminative classifier-derived value of the approximate position of the main microphone 25 is compared to the measured position of the main microphone 25 identified by the testing data unit of block 405. At block 425, a determination can be made as to whether the discriminative classifier-derived value of the approximate position of the main microphone 25 is substantially the same as, or about the same as, the measured position of the main microphone 25 from the testing data unit of block 405; or a determination can be made as to whether any difference between the discriminative classifier-derived value of the approximate position of the main microphone 25 and the measured position of the main microphone 25 from the testing data unit of block 405 are within an acceptable range. In response to a positive determination at block 425, the test method 400 may be ended, and then the discriminative classifier model may be used in the position-checking method 500 of FIG. 7. If a negative determination is made at block 425, processing control can be transferred to block 430, such as for initiating adjustments to and/or retraining of the discriminative classifier model. The testing method 400 may be looped through numerous times respectively for each of the testing data units, and the results of the determining associated with block 425 may be averaged or otherwise processed, for example so that any decision to initiate adjustments to and/or retrain the discriminative classifier model can be based upon an average or other suitable statistical analysis.

Referring to FIG. 5 in greater detail in the context of the testing method 400: the electrical audio signal 310 and any contextual data input 312 are from the testing data unit of block 405 in FIG. 6; the inputs 315, 320, 325, 330 to the discriminative classifier model 305 are derived from the electrical audio signal 310 from block 415 in FIG. 6; and the output 335 of the discriminative classifier model 305 is the discriminative classifier-derived value of the approximate position of the main microphone 25, for block 420. Reiterating from above, it is believed that, as an example, the discriminative classifier model can be a neural network model. For example, it is believed that a suitable testing of the discriminative classifier model/neural network model may be carried out using the MATLAB® programming language and/or Neural Network Toolbox™ available from MathWorks, Inc.

In an embodiment described in the following, the position-checking method 500 of FIG. 7 is performed by the computer 42 to provide an indication of a position of the microphone 25 relative to a user's mouth, and initiate any associated corrective repositioning of the microphone. In addition or alternatively, the indication of the position of the microphone 25 relative to a user's mouth may be considered in performance metrics (e.g., analysis of speech recognition performance). Referring to FIG. 7 in greater detail, at block 505, the main microphone 25 of a headset 15 being worn by a user captures speech audio from a user's mouth, and the headset assembly 10 responsively provides an electrical signal indicative of the speech audio to the computer 42, wherein the electrical signal can be an electronic audio signal. At substantially the same time that the headset assembly 10 responsively provides the audio signal of block 505 (e.g., in real time), at block 510 the computer 42 can receive the audio signal from block 505. Also at or associated with block 110, the computer 42 can obtain or receive data for one or more contextual variables that may be useful as inputs for the discriminative classifier model. The data for the one or more contextual variables associated with block 510 can be referred to as contextual data. For the position-checking method 500, the contextual variables may include one or more of any gain setting of the system 40 (e.g., for increasing the power or amplitude of the electronic audio signal originating at block 105), a classification of the background noise (e.g., identification of the frequency content of the background noise) and/or any other suitable information. It is typical for the contextual data that is in the possession of the computer 42 at block 510 to have originated at the same time as the occurrence of block 505, or otherwise be representative of conditions occurring at block 505.

Processing control is transferred from block 510 to block 515. At block 515, data is derived from the audio signal received at block 510, as discussed in greater detail below with reference to FIG. 5. Processing control is transferred from block 515 to block 520. At block 520, any contextual data (e.g., not any measured position of the main microphone 25) from block 510 and derived data from block 515 are provided as inputs to the discriminative classifier model, as discussed in greater detail below with reference to FIG. 5. Processing control is transferred from block 520 to block 525. At block 525, a discriminative classifier-derived value of the approximate position of the main microphone 25 relative to the user's mouth (e.g., the approximated distance between the main microphone and the user's mouth) is received from the discriminative classifier model.

Processing control is transferred from block 525 to block 530. At block 530, the discriminative classifier-derived value of the approximate position of the main microphone 25 from the user's mouth is compared to an acceptable value or an acceptable range. For example, as discussed above and as best understood with reference to FIG. 1, an acceptable value for block 530 can be indicative of the microphone 25 being about one inch away from the user's mouth; an unacceptable value can be indicative of the microphone being in an inner position in which the microphone may be in contact with, or almost in contact with, the user's mouth; and another unacceptable value can be indicative of the microphone being in an outer position in which the microphone may be about two inches away from the user's mouth. For example, an acceptable range for block 530 can be from a value indicative of the microphone 25 being from about half an inch away from the user's mouth to a value indicative of the microphone being about one and a half inches from the user's mouth, or any other suitable range. At block 530, if it is determined that the discriminative classifier-derived value of the approximate position of the main microphone 25 from the user's mouth is substantially close to an acceptable value or within an acceptable range, the position-checking method 500 can be ended. If a negative determination is made at block 530, processing control can be transferred to block 535.

At block 535, the computer 42 can initiate and provide a signal to the headset assembly 10 by way of the communication path 44. As examples, the signal provided at block 535 can be an audio signal that is received by the one or more speakers 20 of the headset 15, so that the speakers provide an audio indication that the position of the main microphone 25 of the headset is unacceptable. More specifically and depending upon the determination made at block 530, the signal provided at block 535 to the one or more speakers 20 can be configured so that the speakers provide an audio indication that the main microphone 25 should be moved closer to, or farther away from the user's mouth, whichever the case may be. The position-checking method 500 may be looped through numerous times respectively for each of the testing data units, words, phonemes or the like, and the results of the determining associated with block 530 may be averaged or otherwise processed, so that any decision made at block 530 can be based upon an average or other suitable statistical analysis.

The position-checking method 500 of FIG. 7, or the like, can further include a block or step for providing the discriminative classifier-derived value of the approximate position of the main microphone 25 from the user's mouth, which is received at block 525, to one or more other suitable features. For example, the discriminative classifier-derived value of the approximate position of the main microphone 25 from the user's mouth may be considered in performance metrics (e.g., analysis of speech recognition performance). More specifically and/or as another example, the discriminative classifier-derived value of the approximate position of the main microphone 25 from the user's mouth, which is received at block 525, can be written to a streaming log, data file, or the like, so that it is available for use in any suitable manner, such as analyses of performance metrics, or the like. In this regard, the classifier-derived value of the approximate position of the main microphone 25 from the user's mouth, which is received at block 525, can be recorded along with data that is indicative of other appropriate information/events occurring at substantially the same time as the associated occurrence of block 505.

Referring primarily to FIG. 5, for each of the methods 200, 400 and 500, the deriving of the frequency domain input 315 can comprise the computer 42 performing a fast Fourier transform on the electrical audio signal 310. For each of the methods 200, 400 and 500, it is believed that the deriving of speaker normalization input 320 can comprise the computer 42 performing frequency warping, vocal tract length normalization and/or other suitable normalization function(s) on at least a portion of the frequency domain input 315. For each of the methods 200, 400 and 500, the deriving of the text input 325 can comprise the computer 42 performing speech-to-text decoding on the electrical audio signal 310. For each of the methods 200, 400 and 500, the deriving of the phoneme input 330 comprise the computer 42 performing a text-to-phoneme decoding or conversion (e.g., with a text-to-phoneme engine) on the text input 325. One or more of the above-discussed blocks, actions or inputs can be omitted or rearranged in a suitable manner, and suitable additional blocks, actions or inputs may be added.

Referring back to the position-checking method 500 of FIG. 7, in one embodiment the determination made at block 530 can be generally indicative of whether the position of the microphone 25 is "good" or "bad." That is, one aspect if this disclosure is the provision of systems and methods for classifying whether the position of the microphone 25 is "good" or "bad." For example, if a "bad" determination is made at block 530, the signal provided at block 535 can be an audio signal in response to which the one or more speakers 20 provide an audio indication that "the position of the microphone 25 should be corrected," or the like. Alternatively, if a "good" determination is made at block 530, the computer 42 can provide a signal in response to which the one or more speakers 20 provide an audio indication that "the microphone 25 position is satisfactory and does not need to be adjusted.

Referring back to the one or more, or plurality, of inputs of FIG. 5 (e.g., inputs 312, 315, 320, 325, 330), they can comprise the frequency content of the electrical audio signal 310 (e.g., speech signals), input gain (e.g., any gain setting associated with the electrical audio signal 310), the frequency content of the background noise prior to the speech (e.g., spoken utterance), the maximum audio or energy level of the utterance, speaker normalization, and hints. The frequency content of the background noise can be is used to decrease the impact of variation in background noise levels and frequency content. The input gain and maximum audio or energy level of the utterance can be used to decrease the impact of variations in user speech level. Speaker normalization, or more specifically a speaker normalization factor, may be used to account for gender. The hints can be utilized to increase the probability that the classification (e.g., as "good" or "bad") of the position of the microphone 25 is being determined on a correctly recognized word or phoneme, or the like. For example, the computer 42 can be configured to provide, and the discriminative classifier features 305 can be configured to receive, one or more of such phonemes as inputs of the plurality of inputs.

Using hints can comprise weighting predetermined words of the text input 325 more heavily than other words and/or weighting predetermined phonemes of the phoneme input 330 more heavily than other phonemes (e.g., microphone placement may impact some words or phonemes more than others). Using hints can comprise weighting some words and/or phonemes higher than others when making the final classification (e.g., as "good" or "bad") of the position of the microphone 25. Reiterating from above, the deriving of the phenome input 330 can comprise the computer 42 performing a text-to-phoneme decoding or conversion on the text input 325, such as with a text-to-phoneme engine or converter, and the computer 42 can be configured to provide, and the discriminative classifier features 305 can be configured to receive, one or more of such phenomes as inputs of the plurality of inputs. In addition, at least some of the phenomes can be weighted differently from one another. In accordance with one aspect of this disclosure, the hints can be used to assign different (e.g., higher) confidence to the discriminative classifier-derived values of the approximate position of the main microphone 25 from the user's mouth, which are received at block 525. For example, the one or more phenomes can comprise first and second phenomes that are different from one another, and the computer 42 and/or discriminative classifier features 305 may be configured to weight the first and second phenomes differently from one another in the above-described methods. As a more specific example, the first phenome can be weighted more heavily than the second phenome, so that, with all other inputs being equal, a first discriminative classifier-derived value of the approximate position of the main microphone 25 from the user's mouth received at block 525 for the first phenome is weighted more heavily than a second discriminative classifier-derived value of the approximate position of the main microphone 25 from the user's mouth received at block 525 for the second phenome, such as during the above-discussed averaging associated with block 530.

More generally, the computer 42 and/or discriminative classifier features 305 may be configured to weight other inputs differently from one another in the above-described methods. For example, it is believed that a first word can be weighted more heavily than a second word, so that, with all other inputs being equal, a first discriminative classifier-derived value of the approximate position of the main microphone 25 from the user's mouth received at block 525 for the first word is weighted more heavily than a second discriminative classifier-derived value of the approximate position of the main microphone 25 from the user's mouth received at block 525 for the second word, such as during the above-discussed averaging associated with block 530. As another example, some conversion from phoneme/number of phonemes may be mapped to a floating point number in a manner that seeks to optimize the classification (e.g., as "good" or "bad") of the position of the microphone 25.

In one aspect of this disclosure, the supervised training method 200 (FIG. 4) is used to create the discriminative classifier model 305 (FIG. 5), and the computer 42 utilizes the discriminative classifier model for each of numerous headset assemblies 10 in a manner that seeks to ensure that the main microphone 25 of each headset assembly is properly positioned. For example, numerous of the headset assemblies 10 can be operated simultaneously, and the computer 42 and discriminative classifier model 305 can be configured so that the position-detecting method 500 (FIG. 7) is simultaneously performed for each of the headset assemblies. For each of the headset assemblies 10, the position-detecting method 500 can be performed during initial or start-up operations of the headset assembly 10, or at any other suitable run-time.

Further regarding the one or more, or plurality, of inputs of FIG. 5 (e.g., inputs 312, 315, 320, 325, 330), such as at least in the context of the position-checking method 500 (FIG. 7), in one example the inputs can comprise a recent classification (frequency content) of the background noise, input gain (e.g., any gain setting associated with the electrical audio signal 310), and a fast Fourier transform (FFT)/frequency domain input 315 can be calculated for each word in the utterance/electrical audio signal 310. Accordingly, in one aspect of this disclosure, the deriving of one or more inputs for the discriminative classifier features 305 can comprise calculating a FFT on data selected from the group consisting of the electrical audio signal 310 and data derived from the electrical audio signal 310. Such inputs can be the results of the FFTs and/or derived from results of the FFTs. For example, the computer 42 can be configured to provide, and the discriminative classifier features 305 can be configured to receive, one or more Fourier transforms as inputs of the plurality of inputs.

As a further example, a separate FFT can be calculated for each of the frames of each word, for each word the FFT can be saved for each frame, and for each word the FFT for the frames of the word can be averaged. Then for each word, the average FFT, input gain, word identifier, and the maximum audio or energy level for the word can be passed through the discriminative classifier model 305 to determine, or as part of a method to determine, whether the position of the microphone 25 as "good" or "bad", or the like. The classifying of the position of the microphone 25 is "good" or "bad", or the like, can comprise subjecting the analysis to hysteresis in a manner that seeks to prevent the determination from quickly oscillating between determinations of "good" and "bad" in an undesirable manner. As another example, a historical database of selected words and their associated classifications (e.g., as "good" or "bad", or the like) with respect to the position of the microphone 25 can be utilized in a manner that seeks to prevent the system 40 from repeatedly classifying the microphone position incorrectly for a given word just because the specific user differs from the discriminative classifier model 305 more for that word.

An aspect of this disclosure is the provision of a system for determining a relative position of a microphone. For example, the system may be configured for determining an indication of a position of a microphone relative to a user's mouth, wherein the microphone is configured to capture speech audio from the user's mouth, and output an electrical signal indicative of the speech audio. In a first example, the system comprises a computer, and the computer comprises a discriminative classifier and a speech recognition module, wherein the computer is configured to receive the electrical signal, wherein the discriminative classifier is configured to receive a plurality of inputs, and determine an indication of a position of the microphone relative to the user's mouth based upon the plurality of inputs, and wherein the computer is configured so that an input of the plurality of inputs is derived from the electrical signal by the computer prior to the input being received by the discriminative classifier.

A second example is like the first example, except for further comprising a headset that comprises the microphone.

A third example is like the second example, except that in the third example the headset comprises a frame, and the microphone is movably connected to the frame.

A fourth example is like the first example, except that in the fourth example the computer is configured to determine whether the determined indication of the position of the microphone is unacceptable; and provide a signal in response to any determination by the computer that the determined indication of the position of the microphone is unacceptable.

A fifth example is like the fourth example, except for further comprising a headset, wherein: the headset comprises the microphone; the headset further comprises a speaker; the speaker is configured to receive the signal provided by the computer; and the computer is configured so that the signal provided by the computer is configured to cause the speaker to provide an audio indication of the position of the microphone being unacceptable.

A sixth example is like the first example, except that in the sixth example the computer is configured to provide, and the discriminative classifier is configured to receive, at least one Fourier transform as an input of the plurality of inputs.

A seventh example is like the first example, except that in the seventh example the computer is configured to provide, and the discriminative classifier is configured to receive, at least one phoneme as an input of the plurality of inputs.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;

U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;

U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for determining a relative position of a microphone, the method comprising:
   capturing speech audio from a user's mouth with the microphone so that the microphone outputs an electrical signal indicative of the speech audio;
   a computer deriving a plurality of inputs from the electrical signal;
   determining a derived value of an approximate position of the microphone relative to the user's mouth comprising providing, to a discriminative classifier implemented on the computer:
      at least the plurality of inputs and at least some contextual data, the contextual data originating and/or representing conditions occurring at a time when the speech audio is captured;
      the discriminative classifier comprising a model derived from training data and/or test data, the training data and/or the test data comprising a manually measured actual position of a microphone relative to a user's mouth;
   the computer receiving an output from the discriminative classifier, the output providing the derived value of the approximate position of the microphone relative to the user's mouth based at least in part on the plurality of inputs and the contextual data; and
   the computer determining whether the derived value of the approximate position of the microphone is unacceptable at least in part by comparing the derived value to a value or range indicative of the microphone being an acceptable distance relative to the user's mouth, and providing a signal to a user if the derived value of the approximate position of the microphone is unacceptable.

2. The method of claim 1, comprising the computer calculating a Fourier transformation on data selected from the group consisting of the electrical signal and data derived from the electrical signal.

3. The method of claim 2, wherein an input of the plurality of inputs is derived from results from the calculating of the Fourier transformation.

4. The method of claim 1, comprising the computer decoding a phoneme from data selected from the group consisting of the electrical signal and data derived from the electrical signal, wherein an input of the plurality of inputs comprises the phoneme.

5. The method of claim 4, comprising the computer decoding the phoneme using a text-to-phoneme engine.

6. The method of claim 1, comprising:
   deriving first and second inputs of the plurality of inputs from the electrical signal; and
   weighting the first input more heavily than any weighting of the second input in the discriminative classifier.

7. The method of claim 6, comprising providing first and second phenomes that are different from one another, comprising performing text-to-phenome conversions, wherein:
   the first input comprises the first phenome; and
   the second input comprises the second phenome.

8. The method of claim 1, wherein the contextual data comprises at least one of a gain setting, and/or a classification of background noise.

9. A method for determining a relative position of a microphone, the method comprising:
   capturing speech audio from a user's mouth with the microphone so that the microphone outputs an electrical signal indicative of the speech audio;
   determining a derived value of an approximate position of the microphone relative to the user's mouth, comprising providing a plurality of inputs to a computerized discriminative classifier, the discriminative classifier comprising a model derived from training data and/or test data, the training data and/or the test data comprising a manually measured actual position of a microphone relative to a user's mouth wherein:
      a first input of the plurality of inputs is derived from the electrical signal, and a second input of the plurality of inputs comprises contextual data, the contextual data originating and/or representing conditions occurring at a time when the speech audio is captured; and
      an output from the computerized discriminative classifier is the derived value of the approximate position of the microphone relative to the user's mouth, the output derived at least in part from the plurality of inputs.

10. The method of claim 9, comprising:
    a computer determining whether the derived value of the approximate position of the microphone is unacceptable; and
    the computer providing a signal in response to the computer determining that the derived value of the approximate position of the microphone is unacceptable.

11. The method of claim 9, comprising a computer deriving the input from the electrical signal.

12. The method of claim 11, comprising calculating a Fourier transformation on data selected from the group consisting of the electrical signal and data derived from the electrical signal.

13. The method of claim 12, wherein the input comprises results from the calculating of the Fourier transformation.

14. The method of claim 12, wherein the input is derived from results from the calculating of the Fourier transformation.

15. The method of claim 11, comprising decoding a phoneme from data selected from the group consisting of the electrical signal and data derived from the electrical signal.

16. The method of claim 15, wherein the input comprises the phoneme, and the decoding of the phoneme is comprised of using a text-to-phoneme engine.

17. The method of claim 9, comprising:
    deriving first and second inputs of the plurality of inputs from the electrical signal; and
    weighting the first input more heavily than any weighting of the second input in the computerized discriminative classifier.

18. The method of claim 17, comprising providing first and second phenomes that are different from one another, comprising performing text-to-phenome conversions, wherein:
    the first input comprises the first phenome; and
    the second input comprises the second phenome.

19. A method for determining a relative position of a microphone, the method comprising:
    providing a plurality of inputs to a discriminative classifier implemented on a computer, the discriminative classifier comprising a model derived from training data and/or test data, the training data and/or the test data comprising a manually measured actual position of a microphone relative to a user's mouth, and the plurality of inputs comprising: (i) an electrical signal output from the microphone in response to the microphone capturing speech audio from a user's mouth while the microphone is at a position relative to the user's mouth, and/or data derived from the electrical signal; and (ii) contextual data, the contextual data originating and/or representing conditions occurring at a time when the speech audio is captured;

the computer receiving an output from the discriminative classifier, the output providing a derived value of an approximate position of the microphone relative to the user's mouth, the derived value based at least in part on the plurality of inputs; and the computer determining whether the derived value of the approximate position of the microphone is unacceptable at least in part by comparing the derived value output from the discriminative classifier to a value or range indicative of the microphone being an acceptable distance relative to the user's mouth, and providing a signal if the derived value of the approximate position of the microphone is unacceptable.

20. The method of claim 19, wherein the microphone is part of a head set that further comprises a speaker, and the method comprises the speaker providing an audio indication that the position of the microphone is unacceptable, wherein the speaker providing the audio indication is in response to the computer providing the signal.

21. The method of claim 19, comprising deriving the input from the electrical signal, wherein the input is selected from the group consisting of a Fourier transform and a phenome.

* * * * *